United States Patent [19]
Zolotoochin et al.

[11] Patent Number: 5,624,647
[45] Date of Patent: *Apr. 29, 1997

[54] METHOD FOR RECOVERY OF ALKALI VALUES FROM TRONA USING TWO-STAGE LEACHING

[75] Inventors: Vladimir M. Zolotoochin, The Woodlands, Tex.; David R. Delling, Taos, N.M.; Robert N. Skogley, Green River, Wyo.; Francis M. Coustry, Houston, Tex.

[73] Assignee: Solvay Minerals, Inc., Houston, Tex.

[*] Notice: The term of this patent shall not extend beyond the expiration date of Pat. No. 5,618,504.

[21] Appl. No.: 438,344

[22] Filed: May 10, 1995

[51] Int. Cl.$^6$ .............. C01D 1/00; C01D 7/26; C22B 26/10
[52] U.S. Cl. .............. 423/206.2; 423/189; 423/186
[58] Field of Search .............. 23/302 T; 423/206.2, 423/189, 186

[56] References Cited

U.S. PATENT DOCUMENTS

| | | | |
|---|---|---|---|
| 1,759,361 | 5/1930 | Miller et al. | 423/192 |
| 2,049,249 | 7/1936 | Cunningham | 423/421 |
| 2,161,711 | 6/1939 | Keep et al. | 423/197 |
| 2,343,080 | 2/1944 | Pike | 423/181 |
| 2,704,239 | 3/1955 | Pike | 423/190 |
| 2,770,524 | 11/1956 | Seaton et al. | 423/195 |
| 2,962,348 | 11/1960 | Seglin et al. | 423/206.2 |
| 3,131,996 | 5/1964 | Seglin et al. | 423/206.2 |
| 3,479,134 | 11/1969 | Warzel | 423/206.2 |
| 3,498,744 | 3/1970 | Frint et al. | 423/198 |
| 3,655,331 | 4/1972 | Seglin et al. | 423/207 |
| 3,991,160 | 11/1976 | Gancy et al. | 423/184 |
| 4,022,867 | 5/1977 | Gancy et al. | 423/184 |
| 4,039,617 | 8/1977 | Kuo | 423/186 |
| 4,044,097 | 8/1977 | Gancy et al. | 423/186 |
| 4,160,812 | 7/1979 | Conroy et al. | 423/421 |
| 4,179,493 | 12/1979 | Sadan | 423/279 |
| 4,202,667 | 5/1980 | Conroy et al. | 423/206.2 |
| 4,283,372 | 8/1981 | Frint et al. | 423/206.2 |
| 4,286,967 | 9/1981 | Booth, Jr. et al. | 23/298 |
| 4,291,002 | 9/1981 | Arnold et al. | 423/189 |
| 4,344,650 | 8/1982 | Pinsky et al. | 423/206.2 |
| 4,401,635 | 8/1983 | Frint | 423/206.2 |
| 4,405,592 | 9/1983 | Nakaya et al. | 423/421 |
| 4,557,910 | 12/1985 | Meadow | 423/206.2 |
| 4,564,508 | 1/1986 | Fairweather et al. | 423/189 |
| 4,584,077 | 4/1986 | Chlanda et al. | 423/206.2 |
| 4,636,289 | 1/1987 | Mani et al. | 423/206.2 |
| 4,652,054 | 3/1987 | Copenhafer et al. | 423/206.2 |
| 4,654,204 | 3/1987 | Copenhafer et al. | 423/422 |
| 4,814,151 | 3/1989 | Benke | 423/206.2 |
| 4,869,882 | 9/1989 | Dome et al. | 423/206 T |
| 5,043,149 | 8/1991 | Frint et al. | 423/206 T |
| 5,198,145 | 3/1993 | Lobunez et al. | 423/421 |
| 5,238,664 | 8/1993 | Frint et al. | 423/206.2 |
| 5,262,134 | 11/1993 | Frint et al. | 423/184 |
| 5,270,023 | 12/1993 | May et al. | 423/182 |
| 5,283,054 | 2/1994 | Copenhafer et al. | 423/206.2 |

FOREIGN PATENT DOCUMENTS

| | | | |
|---|---|---|---|
| 5981 | 12/1979 | European Pat. Off. | 423/206.2 |
| 59-69423 | 4/1984 | Japan | 423/189 |

*Primary Examiner*—Steven Bos
*Attorney, Agent, or Firm*—Brinks Hofer Gilson & Lione

[57] ABSTRACT

A process for recovering alkali values from trona ore by partially dissolving trona in a first dissolving solution to form a first feed liquor and undissolved trona. The first feed liquor is cooled and sodium carbonate decahydrate is precipitated. The sodium carbonate decahydrate is recovered from the resultant first mother liquor that is returned as the first dissolving solution. The undissolved trona is further dissolved in a second dissolving solution to form a second feed liquor. The second feed liquor is preferably carbonated to convert sodium carbonate into sodium bicarbonate, and cooled to precipitate sodium bicarbonate. The sodium bicarbonate is recovered from the resultant second mother liquor that is returned as the second dissolving solution.

45 Claims, 2 Drawing Sheets

METHOD FOR RECOVERY OF ALKALI VALUES FROM TRONA USING TWO-STAGE LEACHING

BACKGROUND OF THE INVENTION

This invention relates to a method of recovering alkali values from trona ore. In particular, this invention relates to a process for dissolving trona ore to recover separately sodium bicarbonate and sodium carbonate and produce dense soda ash.

Trona ore is a mineral that contains about 90–95% sodium sesquicarbonate ($Na_2CO_3 \cdot NaHCO_3 \cdot 2H_2O$). A vast deposit of mineral trona is in southwestern Wyoming near Green River. By conservative estimates, this deposit contains about 75 billion metric tons of trona ore.

The sodium sesquicarbonate found in trona ore dissolves in water to yield approximately 5 parts by weight sodium carbonate ($Na_2CO_3$) and 4 parts sodium bicarbonate ($NaHCO_3$). To recover these valuable alkali products, the trona ore must be processed to remove insoluble materials and other impurities.

One such valuable alkali produced from trona is soda ash (a commercial grade of sodium carbonate). Soda ash is one of the largest volume alkali commodities made in the United States. In 1992, trona-based soda ash from Wyoming comprised about 90% of the total U.S. soda ash production. Soda ash finds major use in the glass-making industry and for the production of baking soda, detergents and paper products.

Typically, dense soda ash is produced from trona ore in a process known as the "monohydrate process", which consumes great quantities of water (a scarce and valuable resource in Wyoming) and energy. In that process, crushed trona ore is first calcined (i.e., heated) at a temperature between 125° C. and 250° C. to convert the sodium bicarbonate into sodium carbonate.

When the trona ore is calcined, the sodium sesquicarbonate in the trona ore breaks down into sodium carbonate, carbon dioxide and water. Also, calcination releases some of the organics associated with trona or trona shale.

The resulting sodium carbonate and the released organics are then dissolved in water. Any undissolved solids are then filtered and the solution is treated with activated carbon to remove some of the dissolved organics.

The filtered solution of sodium carbonate is fed to an evaporative crystallizer. Water is evaporated and the sodium carbonate forms into sodium carbonate monohydrate crystals ($Na_2CO_3 \cdot H_2O$). The crystals are removed and then calcined, or dried, to convert it to dense soda ash.

One of the perceived advantages of the monohydrate process is that calcined trona dissolves faster than raw trona. Another perceived advantage is that dissolved, calcined trona produces a more concentrated sodium carbonate solution of about 30%, while dissolved raw trona produces a solution having only about 16% sodium carbonate plus 10% sodium bicarbonate.

However, the monohydrate process has several disadvantages. Presently, the monohydrate process consumes considerable amounts of water. When the raw trona ore is calcined, the natural water content is evaporated. Yet after that water is evaporated off, more water must be added to dissolve the calcined trona.

In addition to consuming water, the monohydrate process consumes and wastes considerable amounts of energy. Calcining equipment, for example, has only about 50% energy efficiency. Much energy is also wasted in calcining simply to raise the temperature of the sodium carbonate in the trona up to the calcining temperature even though the sodium carbonate itself does not undergo conversion. Finally, a significant amount of energy is wasted during calcining in evaporating the naturally occurring water in the trona.

Another disadvantage of the monohydrate process is that the feed solution can only contain a maximum of about 30% sodium carbonate. The evaporative crystallizers could be more efficiently operated if a more concentrated feed solution were used.

Therefore, there is a need to provide a simple, energy-efficient and water-conserving process to recover alkali values from trona ore.

SUMMARY OF THE INVENTION

This invention is a method for recovering alkali values from underground trona deposits that saves energy and conserves water. In this invention, the mined trona ore is dissolved in a two-stage leaching circuit. In the first stage, sodium carbonate is leached from the trona ore. In the second stage, the sodium bicarbonate is leached. This invention advantageously exploits the propensity of trona ore to incongruently dissolve to separate sodium carbonate from sodium bicarbonate.

First, the trona ore is partially dissolved in a cool solution to form an alkali-containing feed liquor that is rich in sodium carbonate and has a low concentration of sodium bicarbonate. By not initially calcining the trona ore, as is done in the monohydrate process, a major source of energy consumption is eliminated. Also, by not calcining the trona ore, the water naturally present in the trona is not evaporated, but is recovered in the process. An added advantage of not calcining the trona ore is that a major source of air pollution is eliminated.

This first feed liquor is then separated from the remaining insoluble particles, undissolved trona and undissolved sodium bicarbonate crystals. The undissolved trona, insoluble particles and other solids are fed to a second dissolving solution at a higher temperature. At this higher temperature most of the remaining solids are dissolved to form a second alkali-containing feed liquor that is rich in sodium bicarbonate but relatively weak in sodium carbonate.

This second feed liquor is separated from the insoluble particles and any other undissolved solids remaining. The insoluble particles and remaining solids are then washed with water. The recovered alkali values are returned to the raw trona ore dissolving solution while the insoluble particles are disposed of.

The first feed liquor is cooled to a lower temperature so that sodium carbonate decahydrate crystals are precipitated. The sodium carbonate decahydrate crystals are separated from the mother liquor.

This first mother liquor is recycled back for use as the dissolving solution for the first stage leaching of the trona ore. This invention saves significant amounts of water compared to the monohydrate process, in this regard, because the mother liquor is recycled to dissolve the trona.

The recovered sodium carbonate decahydrate crystals are melted and then passed to an evaporative crystallizer where sodium carbonate monohydrate crystals are precipitated, and water is evaporated. The evaporative crystallizer requires less energy to operate in this process because it is fed with a solution of melted decahydrate crystals that has a higher equivalent concentration of sodium carbonate than the feed solution in the monohydrate process.

The sodium carbonate monohydrate crystals are recovered and then dried into dense soda ash.

The second feed liquor is carbonated to convert the remaining sodium carbonate into sodium bicarbonate. This enriched second feed liquor is cooled to a lower temperature and sodium bicarbonate crystals are precipitated. The sodium bicarbonate crystals are separated from the second mother liquor. The second mother liquor is recycled back for use as the dissolving solution to dissolve the solids in the second stage leaching circuit.

The recovered sodium bicarbonate crystals are then calcined to convert to light soda ash. The light soda ash may be densified by recrystallization into sodium carbonate monohydrate, which is then dried at a higher temperature to form a dense soda ash product.

Thus, this invention offers several advantages over the monohydrate process. This invention saves energy by eliminating the calcining of the trona ore and by feeding a more concentrated solution to the evaporative crystallizer.

Also, this invention saves water by eliminating the calcining of trona ore and by recycling the mother liquors for dissolving the trona.

Further, advantages of these process will be apparent from the following detailed description.

DETAILED DESCRIPTION OF THE INVENTION

Figure 1:
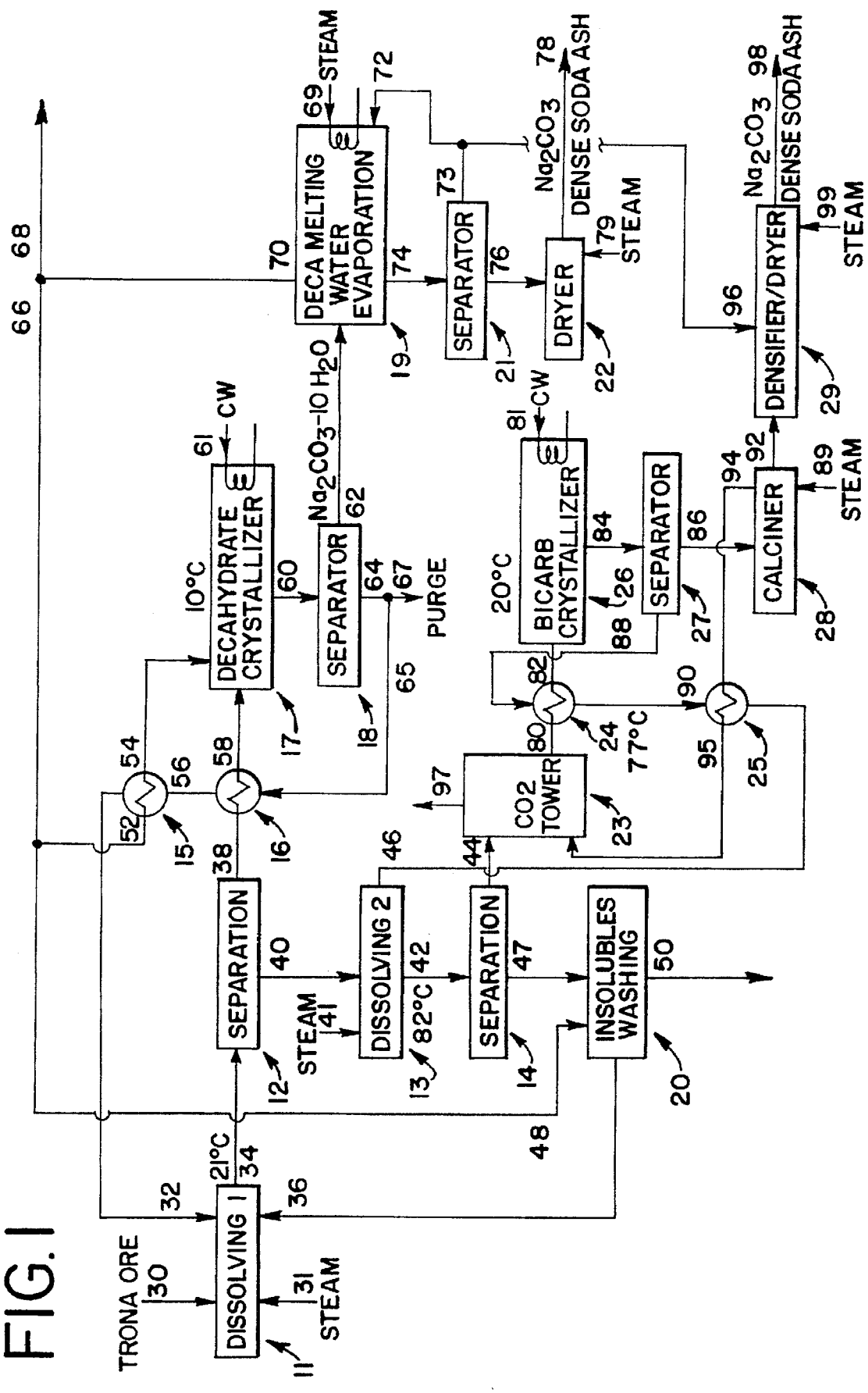
FIG. 1 is a block process flow diagram of one embodiment of the present invention.
Figure 2:
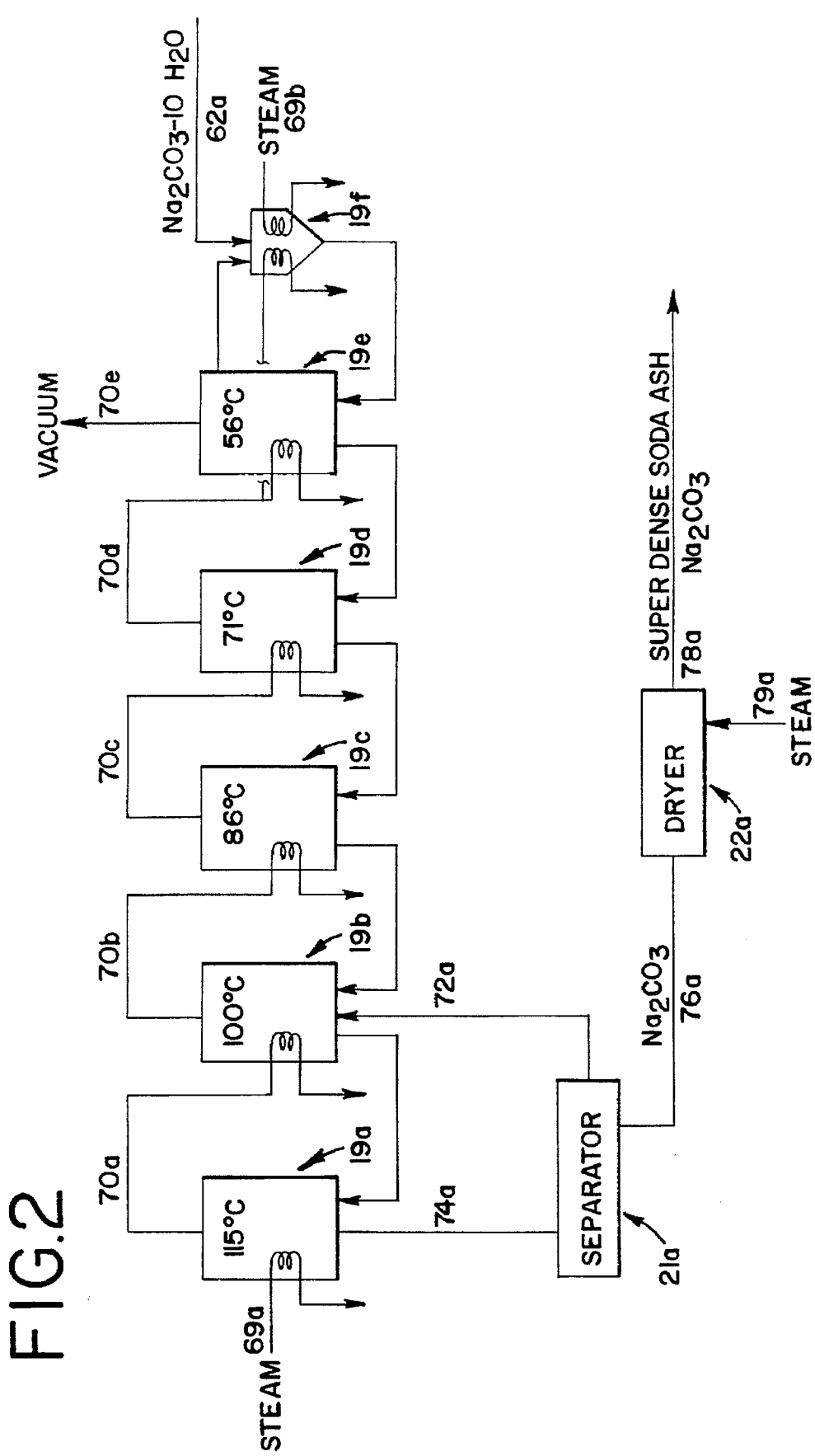
FIG. 2 is a block process flow diagram of one embodiment of a multi-stage evaporative crystallization process for processing the melted sodium carbonate decahydrate crystals.

This invention is very advantageous for the production of dense soda ash, or sodium carbonate, as compared to producing the same through the monohydrate process. The present invention, in all its embodiments, is perhaps best understood by reference to the process flow diagram in FIG. 1.

Basically, the invention provides a process for partially dissolving trona ore in a first-stage leaching circuit 11 at a relatively cool temperature to produce a first feed liquor relatively rich in sodium carbonate. The undissolved material is filtered from the first feed liquor in the first-stage separator 12. The solids then pass to a second-stage leaching circuit 13 to dissolve at a higher temperature the remaining alkali values to produce a second feed liquor relatively rich in sodium bicarbonate. The insoluble material is filtered from the second feed liquor in the second-stage separator 14. Any alkali values are removed from the insolubles in the insolubles washing 20 and recycled to the first-stage leaching circuit 11. The insoluble material is disposed.

The first feed liquor is cooled to precipitate sodium carbonate decahydrate in the decahydrate crystallizer 17. The decahydrate crystals are removed from the mother liquor and then melted. The melt is heated to evaporate the water and form sodium carbonate monohydrate crystals in the evaporative crystallizer 19. The monohydrate crystals are removed and fed to a dryer 22 to convert to dense soda ash.

The second feed liquor is fed to a carbonation tower 23 to convert sodium carbonate to sodium bicarbonate. This feed liquor is cooled to precipitate sodium bicarbonate in the bicarbonate crystallizer 26. The bicarbonate crystals pass to a calciner 28 to convert to light soda ash. The light soda ash is then mixed with an aqueous solution in a densifier 29 and converted to dense soda ash.

In detail, as shown in FIG. 1, one embodiment of the process begins by taking an alkali containing ore, such as trona ore, and introducing it into a first-stage leaching circuit 11. The leaching circuit may include either a dissolving trommel or an agitated dissolving tank. Typically, trona ore is mined underground and then transferred to the surface and placed in an ore storage bin. Generally, additional crushing or screening of the mined trona ore is not required before placing it into a dissolving trommel, but would be required if a dissolving tank were used. For the purpose here of describing the invention, a dissolving tank 11 is used hereafter.

A first dissolving solution is added via line 32 to the dissolving tank 11. The goal for dissolving the trona ore at this stage is to achieve a first feed liquor coming out of the dissolving tank 11 through line 34 with sufficient sodium carbonate and sodium bicarbonate concentration so that sodium carbonate decahydrate crystals will precipitate out when the feed liquor is later cooled, as discussed below. Thus, the first feed liquor should have a concentration of sodium carbonate between about 5% and 33%, and a concentration of sodium bicarbonate up to about 5%.

Excess trona is partially dissolved in a dissolving solution, introduced through line 32 into the dissolving tank 11, that has been heated to a temperature of between about 5° C. and about 40° C. Preferably, the temperature is between about 10° C. and about 25° C. With the solution reaching equilibrium with the trona ore, the maximum concentration of sodium carbonate in solution is reached at about 21° C.

For practical purposes it is desirable that the resulting first feed liquor be saturated with as much sodium carbonate as possible but having as little sodium bicarbonate as possible. Therefore, it is preferred that the trona ore be partially dissolved in the first dissolving tank 11 at a temperature of about 20° C. Steam is charged directly via line 31 to the dissolving tank 11 to maintain the desired temperature. At about 20° C. the resulting first feed liquor will contain about 17 weight percent sodium carbonate and about 4 weight percent sodium bicarbonate.

Even though the natural trona ore contains about 5 parts sodium carbonate for every 4 parts of sodium bicarbonate, this invention takes advantage of the incongruent dissolution of trona to produce a first feed liquor that is relatively rich in sodium carbonate and relatively weak in sodium bicarbonate. Sodium sesquicarbonate dissolves to produce the ratio of constituents as noted above. However, the dissolving solution is already nearly saturated with sodium bicarbonate. Therefore, at the temperature at which the first dissolving stage is operated, excess trona causes sodium bicarbonate to re-crystallize until equilibrium conditions are reached. Most of the sodium carbonate from the trona dissolves in the solution while the sodium bicarbonate from the trona precipitates out. Thus, the first feed liquor will be weak in sodium bicarbonate and rich in sodium carbonate.

The dissolved alkali first feed liquor contains suspended insoluble particles and undissolved trona ore and sodium bicarbonate crystals. This first feed liquor is passed via line 34 to the first stage separator 12. This separator 12 can be a combination of a number of different equipment known to those skilled in the art. Equipment such as belt filters, drum filters, and thickeners may be used. The first feed liquor is also polish filtered. This feed liquor may then be stored in a decahydrate crystallizer feed tank (not shown) where the temperature is maintained at or above 20° C.

The solids removed from the separator 12 are then passed via line 40 to a second dissolving tank 13. A heated dissolving solution is added via line 46 to the second dissolving tank 13. The goal for dissolving the remaining solids at this second stage is to achieve almost complete dissolution of the sodium bicarbonate and remaining trona ore. The heated dissolving solution may be at a temperature of between about 40° C. and about 110° C. Preferably, the temperature is between about 70° C. and about 90° C. It is most preferred that the trona be dissolved at a temperature of about 80° C. to dissolve as much of the remaining solids as possible yet still efficiently utilize the energy for heating the solution.

The resulting second feed liquor contains suspended insoluble particles and possibly some remaining undissolved trona ore. This material is passed via line 42 to the second stage separator 14. The solids are separated from the second feed liquor. The second feed liquor may also be polish filtered and passed via line 44 to a carbonation tower 23, or else to a bicarbonate crystallizer feed tank (not shown).

These insoluble solids are passed via line 47 to an insoluble washing tank 20. The wash water stream 48 is used to recover any remaining undissolved trona or other dissolved alkali passed along with the insolubles. The alkali and wash water are recycled back via stream 36 to the first stage dissolving tank 11. The washed insoluble particles are sent via line 50 to a tailings disposal system.

Alternatively, the second feed liquor along with small undissolved particles of trona ore and insoluble solids such as shale, will exit dissolving tank 13, through a solids classifier and into a surge tank (not shown). The oversized material would then pass through a wet crusher and return to the feed end of the dissolving tank 13. The feed liquor in the surge tank will contain some undissolved solids. The feed liquor in the surge tank will need to be maintained at a temperature of about 85° C., just above the dissolving temperature, so that the dissolved sodium bicarbonate will not precipitate out. As demanded, the feed liquor will be sent to the second stage separator.

Dissolving the trona in two stages at a cold temperature, about 20° C., in the first stage and at a hot temperature, about 80° C., in the second stage results in two feed liquors having widely disparate concentrations. The first feed liquor from separator 12 may contain between about 5% and 18% sodium carbonate and up to about 5% sodium bicarbonate. Preferably, the first feed liquor 38 contains about 17% sodium carbonate and about 4% sodium bicarbonate. The second feed liquor 44 from separator 14 may contain less than 4% sodium carbonate and more than about 10% sodium bicarbonate. Preferably the second feed liquor contains about 1% sodium carbonate and about 15% sodium bicarbonate.

Of course, one skilled in the art would realize that the resulting solution for the second feed liquor will depend upon the amount of trona ore that has been dissolved in the first stage leaching circuit 11. The more sodium carbonate that is dissolved in the first stage, then the less sodium carbonate will be found in the second feed liquor. Conversely, the less sodium carbonate dissolved in the first stage, then the more sodium carbonate will be found in the second feed liquor. Likewise, the same is true for the sodium bicarbonate. If the first stage dissolving is done at a lower temperature less sodium bicarbonate will dissolve here with more sodium bicarbonate remaining to produce a second feed liquor richer in sodium bicarbonate. Thus, the first feed liquor should have a sodium bicarbonate to sodium carbonate ratio of less than 0.8, the ratio found in trona, and the second feed liquor should have a ratio of more than 0.8.

As shown in FIG. 1, the first feed liquor is passed via line 38 to a heat exchanger 16 to cool the first feed liquor with a mother liquor recycled via line 65 from the decahydrate separator 18. It is desired to cool the feed liquor to between about 0° C. and about 32° C. Preferably, the first feed liquor should be cooled to between about 5° C. and about 20° C. Most preferably, the first feed liquor is cooled to about 10° C. Because the first mother liquor comes from the decahydrate separator preferably at a temperature of about 10° C. it can be used as a primary source of pre-cooling for the first feed liquor. However, cooling water, via stream 61, further cools and maintains the decahydrate crystallizer 17 at the desired temperature.

For practical considerations, a decahydrate crystallization temperature of 10° C. permits circulation of the cooling water through a natural evaporative cooling tower during the grand part of the year because of the colder climate found in Wyoming. Therefore, expensive chilling equipment is likely not necessary to be used in this process the grand part of the year when operating within the preferred range of temperatures.

The first feed liquor may be treated as it is passed via line 58 to the decahydrate crystallizer 17. Cool water may be added through line 54 to the decahydrate crystallizer 17, or elsewhere upstream, to dilute the first feed liquor so that the concentration of sodium bicarbonate is reduced. The first feed liquor should be diluted so that the concentration of sodium carbonate is about 3.5% or less. The dilution insures that no sodium bicarbonate will precipitate out when the first feed liquor is cooled to form sodium carbonate decahydrate crystals.

The sodium carbonate decahydrate crystals that are formed are generally more fragile than sodium bicarbonate crystals. Therefore, the equipment used to crystallize sodium carbonate decahydrate must be selected appropriately. It is considered that a settling tank with general agitation may be well suited for sodium carbonate decahydrate crystallization, as well as, perhaps, an evaporative cooling crystallizer. Of course, the equipment selected may also be influenced by the climate in which the plant is expected to operate. Because the trona ore deposits are found in Wyoming, the colder weather there may be advantageously used to effect the cooling of the feed liquor. One skilled in the art should realize that this may also influence the temperatures to which the feed liquor is to be cooled for optimizing the energy efficiency of the process.

A slurry is formed in the crystallizer 17 that contains sodium carbonate decahydrate crystals and a first mother liquor. This slurry is passed via line 60 to a separator 18. The separator 18, which may be a low rpm centrifuge or other gentle separation equipment, separates sodium decahydrate crystals from the resulting mother liquor. The decahydrate crystals are passed via line 62 to a decahydrate melting tank and evaporative crystallizer 19. The weak liquor from the separator 18 in line 64 is split, with a majority of the weak mother liquor being recycled back via line 65 for use as the dissolving solution in the first dissolving tank 11.

Generally, up to about 5% of the first mother liquor coming from the decahydrate separator 18 is purged via line 67 to reduce the impurities, such as organics or chlorides, in the system. Because the trona ore is not calcined in this process, less organics are dissolved into the first feed liquor. Generally the monohydrate process is able to operate with approximately 50 to 66 ppm of organic material (TOC). It is expected that a process practiced according to this invention would also be able to operate with similar amounts of organics, and therefore will require less purge.

Likewise, it is expected that this invention will operate suitably with a level of iron and chlorides in the feed liquor 34 similar to the monohydrate process. An iron content of 1 to 4 ppm and chloride levels of about 0.4% in the feed liquor of a monohydrate process are typically seen. However, because, in this invention, the mother liquor is recycled back to the dissolving tank 11, concentrations of the contaminants can build up in the system. Therefore, it is necessary that some of the first mother liquor be purged. The sodium carbonate decahydrate crystals that precipitate are relatively pure. That is, the decahydrate crystals will not carry the impurities with it into downstream processing. Therefore, all of the contaminants will build up in the first mother liquor that is separated from the decahydrate crystals. The purge stream eliminates some of the contaminants from the system via line 67 and keeps them at a tolerable level. This purge stream can be used to dispose the insoluble particles as tailings returned to the spent trona mines.

The sodium carbonate decahydrate crystals that are transferred via line 62 to the evaporative crystallizer 19 are first melted. As shown in FIG. 3, for example, the decahydrate crystals are typically melted at about 50° C. in a melting tank 19f, and then passed into the last effect 19e of a multiple-effect evaporator. For the multiple-effect evaporator, the melting tank 19f acts as a surface condenser for the vapor from the penultimate effect 19d. The heat is absorbed by the melting decahydrate crystals. The temperature of this unit is maintained by the regulation of steam fed via line 69b. As the melted decahydrate advances through the multiple effects, water is evaporated from the solution. The solution becomes supersaturated and sodium carbonate monohydrate crystals precipitate.

The feed rates and the temperatures of the evaporator effects are generally driven by product demand. If desired, the first effect should be operated below 110° C. so that the slurry removed from this effect via line 74 contains sodium carbonate monohydrate crystals. Above 110° C., anhydrous sodium carbonate crystals are produced. For example, in this embodiment, in FIG. 1, a four-stage multiple-effect evaporator may be used where effects 1 through 4 are operating at the temperatures of 105° C., 94° C., 83° C. and 72° C., respectively, to produce sodium carbonate monohydrate.

This evaporative crystallization step is substantially the same as is known in the prior art monohydrate process. However, one major disadvantage of the monohydrate process is that dissolved calcined trona is introduced into the evaporators having a maximum concentration of about 30% sodium carbonate. In the present invention, the solution fed into the evaporators has an "equivalent" 37% concentration of sodium carbonate. By "equivalent," it is to be understood that the sodium carbonate decahydrate has melted into a solution having the maximum concentration of sodium carbonate in the solution of about 30%, plus about an additional 7% of the sodium carbonate in crystalline form. This means that less water need be evaporated to obtain a slurry of sodium carbonate monohydrate, with a corresponding 40% savings in energy.

The slurry is passed via line 74, as shown in FIG. 1, to a separator 21 that typically is a centrifuge. Sodium carbonate monohydrate crystals are removed from the resulting filtrate liquor and passed via line 76 to a dryer 22. In the dryer 22, typically a rotary-type steam heated dryer, the crystals undergo a phase change from monohydrate to anhydrous sodium carbonate. The free moisture and the hydrate is heated and driven off to produce dense soda ash, removed via line 84.

The filtrate liquor that leaves the separator 21 via line 73 may be recycled back via line 72 to the evaporator 19. Also, some of the filtrate liquor may be used via line 96 to densify the light soda ash and produce a sodium carbonate monohydrate crystal that may be dried into dense soda ash. If necessary a small purge stream of the filtrate liquor may be removed to maintain any contaminants at a low tolerable level. However because sodium carbonate decahydrate crystals are formed in a very pure state, very few of the impurities will pass to the evaporative crystallizer 19.

As shown in FIG. 1, the second feed liquor is passed via line 44 to a carbonation tower 23 to convert sodium carbonate in the second feed liquor into sodium bicarbonate. In the carbonation tower 23, carbon dioxide and other gases coming from the bicarbonate calciner 28 via lines 94 and 95 are bubbled up through the second feed liquor solution in the tower. This additional carbon dioxide bubbling through the feed liquor increases the amount of carbon dioxide in the solution which reacts with the sodium carbonate to form sodium bicarbonate according to the following chemical reaction.

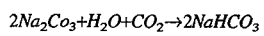

$$2Na_2Co_3 + H_2O + CO_2 \rightarrow 2NaHCO_3$$

The resulting enriched second feed solution contains substantially no sodium carbonate. The enriched second feed liquor is passed via line 80 to a heat exchanger 24 to cool the second feed liquor with the second mother liquor recycled via line 88 from the bicarbonate separator 27. It is desired to cool the second feed liquor to a temperature between about 5° C. and about 50° C. Preferably, the second feed liquor should be cooled to between about 10° C. and about 30° C. Most preferably, the second feed liquor is cooled to about 20° C. Because the second mother liquor comes from the bicarbonate separator 27 at a temperature of 20° C., it can be used as a primary source of cooling for the second feed liquor to reach close to the desired bicarbonate crystallization temperature. However, cooling water via stream 81 maintains a precise temperature in the bicarbonate crystallizer 26.

As the second feed liquor is cooled, sodium bicarbonate crystals form. Therefore, the second feed liquor cooler 24 may be an integral part of the bicarbonate crystallizer 26. Although a separate crystallizing tank may be used, good quality crystals can be obtained by cooling and crystallizing the sodium bicarbonate in a tower crystallizer or column crystallizer. The sodium bicarbonate crystals that will be obtained from cooling in one step from about 80° C. down to about 20° C. may tend to be small. It is possible to obtain bigger size sodium bicarbonate crystals by cooling the feed liquor in several stages. Better quality, larger size crystals can be obtained by first cooling and crystallizing sodium bicarbonate at a temperature of between about 47° C. and about 60° C., and then cooling and further crystallizing sodium bicarbonate at a second temperature of between about 17° C. and about 23° C. Most preferably, the feed liquor is first cooled to about 53° C. and then further cooled to about 20° C.

After crystallization, a slurry of the sodium bicarbonate crystals and the resultant mother liquor is transferred via line 84 to a separator 27. From this separator 27, which may be a belt filter, a centrifuge or a settling tank, for example, sodium bicarbonate crystals are removed. If the second feed liquor was prepared at about 84° C. and then cooled to 20° C., then the second mother liquor removed from the separator 27 has a concentration of about 10% sodium bicarbonate.

The sodium bicarbonate crystals which are removed from the separator 27 may be transferred via line 86 to a bicarbonate calciner 28 where the free water is evaporated and the bicarbonate crystals converted into sodium carbonate. Typically, a rotary dryer may be used to calcine the sodium bicarbonate with steam via line 89 as the heat source. The sodium carbonate produced thereby is a commercial grade known as light soda ash. The carbon dioxide that has evolved from the calcined sodium bicarbonate crystals along with heated water vapor pass via line 94 to the second mother liquor heater 25. This heat exchanger is used to heat up the second mother liquor so that it may be used for the dissolving solution in the second stage dissolving tank 13. The carbon dioxide and other vapors are then fed via line 95 to the carbonation tower 23.

The light soda ash is fed via line 92 into a densifier/dryer 29. In the densifier section, the light soda ash is moistened with an aqueous solution, such as filtrate liquor from the monohydrate separator 21 via line 96. The light soda ash absorbs the water and forms sodium carbonate monohydrate crystals. Steam via line 99 heats the dryer section to convert the monohydrate into a dense soda ash product.

Table 1 provides an example of the flow rates for the major streams for the above-described process as depicted in FIG. 1 and operated at the most preferred conditions. The material balance is based on all the sodium bicarbonate crystals being calcined and further processed into dense soda ash.

TABLE 1

FLOW RATES (tons/hr)

| Stream Reference | $NaHCO_3$ | $Na_2CO_3$ | $H_2O$ | Total (including others) |
|---|---|---|---|---|
| 30 | 34.4 | 43.6 | 15.0 | 100.0 |
| 32 | 17.1 | 37.0 | 322.9 | 377.0 |
| 36 | 0 | 0 | 24.2 | 24.2 |
| 38 | 17.2 | 75.8 | 347.6 | 440.6 |
| 54 | 0 | 0 | 45.2 | 45.2 |
| 62 | 0.4 | 38.8 | 69.6 | 108.8 |
| 40 | 34.3 | 4.8 | 14.5 | 60.6 |
| 46 | 39.2 | 0 | 414.1 | 453.3 |
| 44 | 73.5 | 4.8 | 417.6 | 496.0 |
| 47 | 0 | 0 | 11.0 | 18.0 |
| 50 | 0 | 0 | 1.3 | 8.3** |
| 48 | 0 | 0 | 14.5 | 14.5 |
| 80 | 81.1 | 0 | 417.6 | 498.7 |
| 70 | 0 | 0 | 61.2 | 61.2 |
| 76 | 0.4 | 38.8 | 8.4 | 47.6 |
| 78 | 0 | 38.8 | 0 | 38.8 |
| 86 | 41.9 | 0 | 2.6 | 44.5 |
| 94 | 0 | 0 | 7.1 | 18.1* |
| 98 | 0 | 26.5 | 0 | 26.5 |

*includes 11.0 TPH of $CO_2$
**includes 7.0 TPH of insolubles

In an alternative embodiment for the decahydrate melting and evaporation 19, FIG. 3 depicts a five-stage multiple-effect evaporator where anhydrous sodium carbonate crystals are formed. To obtain anhydrous sodium carbonate crystals, the first effect of the evaporator must be operated above 110° C. By operating the effects 1–5 at temperatures of 115° C., 100° C., 86° C., 71° C. and 56° C. respectively, anhydrous sodium carbonate may be efficiently produced. The anhydrous sodium carbonate crystals are passed via line 76a to a dryer where the free moisture is removed and super dense soda ash crystals are produced.

One advantage of producing anhydrous sodium carbonate crystals in the evaporative crystallizers, as compared with sodium carbonate monohydrate crystals, is that this final drying treatment of the crystals requires 85% less energy because only the free moisture is driven off and not the hydrate complexed with the crystal. Therefore, further energy savings are realized by this drying step in this embodiment.

One skilled in the art may appreciate that another advantage of this invention is that some equipment from an existing monohydrate process plant may be used for practicing this invention. As described above, the sodium carbonate decahydrate crystals that are melted are sent into an evaporative crystallizer. These evaporative crystallizers are generally the most expensive part of a dense soda ash production plant. Therefore, it is very cost efficient to retrofit an existing monohydrate process plant for producing dense soda ash according to this invention.

Because most monohydrate processes use multiple-effect evaporative crystallizers, the same equipment can be retrofitted for use with the melted sodium carbonate decahydrate crystals produced by this invention. The sodium carbonate decahydrate crystals have a higher equivalent concentration of sodium carbonate, 37% compared to 30% for the monohydrate process, when it is melted before passing into the evaporative crystallizers. Thus, higher throughputs may be obtained with the old equipment retrofitted for this new process.

Also, the same monohydrate crystal separator equipment and the same monohydrate crystal dryer may be retrofitted used to produce dense soda ash according to this invention. Some of the equipment from the existing monohydrate process may not be needed, such as the trona or calciner, for example. But, the calcined trona ore dissolving tank can be retrofitted for dissolving the raw trona ore that is used as the feed stock for the process according to the present invention. Therefore, one skilled in the art may readily adapt an existing monohydrate process plant and use much of the same equipment to practice this invention.

This invention, as heretofore described, has numerous advantages over the prior art monohydrate process. Significant energy savings are realized by eliminating the step of calcining the trona ore. Further energy savings are achieved by feeding a more concentrated equivalent sodium carbonate solution to the evaporative crystallizer. Even more energy savings may be realized by producing anhydrous sodium carbonate crystals in the evaporative crystallizers so that less energy is required to dry the final dense soda ash product. Further, the cold climate of Wyoming is exploited for minimizing the costs required to cool the process streams for the crystallization of sodium bicarbonate and sodium carbonate decahydrate.

Moreover, significant reduction of water consumption is realized by this invention. By eliminating the step of calcining the trona ore, the natural water contained in the trona is added to the process. Rather than using fresh water, the trona is dissolved with a recycled low carbonate solution. Also, fresh water requirements may be supplied from recycled water evaporated in the evaporative crystallizer.

It is therefore intended that the foregoing detailed description be regarded as illustrative rather than limiting, and that it be understood that it is the following claims, including all equivalents, which are intended to define the scope of this invention.

What is claimed is:

1. A method of recovering alkali values from alkali-containing ore which comprises:
   (a) dissolving some of an alkali-containing ore in a first dissolving solution to form a first dissolved alkali feed liquor having suspended therein insoluble particles and undissolved ore;
   (b) removing the suspended insoluble particles and undissolved ore from the first feed liquor;
   (c) cooling the first feed liquor and precipitating sodium carbonate decahydrate crystals thereby forming a first mother liquor;
   (d) separating sodium carbonate decahydrate crystals from the first mother liquor;
   (e) dissolving at least some of the undissolved ore in a second dissolving solution to form a second dissolved alkali feed liquor having suspended therein insoluble particles;
   (f) removing the suspended insoluble particles from the second feed liquor;
   (g) cooling the second feed liquor and precipitating sodium bicarbonate crystals thereby forming a second mother liquor;
   (h) separating sodium bicarbonate crystals from the second mother liquor; and
   (i) recovering the alkali values from the sodium carbonate decahydrate crystals and the sodium bicarbonate crystals.

2. The method of claim 1, wherein the first feed liquor has a concentration of sodium carbonate between about 5% and about 33%, and a concentration of sodium bicarbonate between about 0% and about 5%.

3. The method of claim 2, wherein the first feed liquor has a concentration of sodium carbonate between about 5% and about 18%.

4. The method of claim 3, wherein the first feed liquor has a concentration of sodium carbonate about 17%, and a concentration of sodium bicarbonate about 4%.

5. The method of claim 1, wherein step (a) is carried out at a temperature between about 5° C. and 40° C., and step (e) is carried out at a temperature between about 40° C. and 110° C.

6. The method of claim 1, wherein step (a) is carried out at a temperature between about 10° C. and 25° C., and step (e) is carried out at a temperature between about 70° C. and about 90° C.

7. The method of claim 1, wherein step (a) is carried out at a temperature about 20° C., and step (e) is carried out at a temperature of about 80° C.

8. The method of claim 1, wherein the first feed liquor in step (c) is cooled to between about 0° C. and about 32° C.

9. The method of claim 1, wherein the first feed liquor in step (c) is cooled to between about 5° C. and about 20° C.

10. The method of claim 1, wherein the first feed liquor in step (c) is cooled to about 10° C.

11. The method of claim 1, wherein the second feed liquor in step (g) is cooled to between about 5° C. and about 50° C.

12. The method of claim 1, wherein the second feed liquor in step (g) is cooled to between about 10° C. and about 30° C.

13. The method of claim 1, wherein the second feed liquor in step (g) is cooled to about 20° C.

14. The method of claim 1, wherein step (g) includes cooling to a first temperature between about 45° C. and about 60° C., and then cooling to a second temperature between about 10° C. and about 30° C.

15. The method of claim 1, further comprising the step of converting sodium carbonate to sodium bicarbonate in the second feed liquor before cooling.

16. The method of claim 15, wherein the converting is done by carbonating the second feed liquor.

17. The method of claim 1, wherein step (i) includes heating sodium carbonate decahydrate crystals and forming sodium carbonate monohydrate.

18. The method of claim 17, wherein the sodium carbonate monohydrate crystals are dried to form dense soda ash.

19. The method of claim 1 wherein step (i) includes melting sodium carbonate decahydrate crystals and evaporating water therefrom to form sodium carbonate monohydrate crystals.

20. The method of claim 1 wherein step (i) includes melting sodium carbonate decahydrate crystals and evaporating water therefrom to form anhydrous sodium carbonate crystals.

21. The method of claim 19, wherein sodium bicarbonate crystals are calcined to form light soda ash, the light soda ash is densified to form sodium carbonate monohydrate, and the monohydrate is dried to form dense soda ash.

22. The method of claim 19, wherein the insoluble particles are washed by water evaporated from the melted sodium carbonate decahydrate.

23. The method of claim 16, wherein sodium bicarbonate crystals are calcined to form light soda ash.

24. The method of claim 23, wherein carbon dioxide is evolved during the calcining of the sodium bicarbonate and the carbon dioxide is used to carbonate the second feed liquor.

25. The method of claim 1, wherein sodium bicarbonate crystals are dissolved and recrystallized into a refined bicarbonate crystal product.

26. The method of claim 1, wherein the first dissolving solution comprises first mother liquor.

27. The method of claim 1, wherein the second dissolving solution comprises second mother liquor.

28. The method of claim 1, wherein the first feed liquor in step (c) is cooled by the first mother liquor.

29. The method of claim 1, wherein the second feed liquor contains about 1% sodium carbonate and 15% sodium bicarbonate.

30. The method of claim 1, wherein the second feed liquor in step (g) is cooled by the second mother liquor.

31. The method of claim 1, wherein step (i) is carried out in equipment designed for and used an existing sodium carbonate monohydrate process that has been retrofitted.

32. The method of claim 1, wherein the alkali-containing ore is trona ore that has been mined and crushed.

33. A method of recovering alkali values from trona ore, the method comprising:
   (a) introducing trona ore in a first aqueous solution to obtain a first feed liquor containing a ratio of sodium bicarbonate to sodium carbonate of less than about 0.8, and undissolved trona ore;
   (b) cooling the first feed liquor, precipitating sodium carbonate decahydrate crystals and collecting the sodium carbonate decahydrate crystals from a resulting first mother liquor;
   (c) heating the first mother liquor and recirculating it as the first aqueous solution in step (a);
   (d) dissolving undissolved trona ore from step (a) in a second aqueous solution to obtain a second feed liquor containing a ratio of sodium bicarbonate to sodium carbonate of more than about 0.8;
   (e) cooling the second feed liquor, precipitating sodium bicarbonate crystals and collecting the sodium bicarbonate crystals from a resulting second mother liquor; and (f) heating the second mother liquor and recirculating it as the second aqueous solution after recirculating the second mother liquor to step (d).

34. The method of claim 33, further comprising the step of converting sodium carbonate in the second feed liquor into sodium bicarbonate.

35. The method of claim 33, wherein the first feed liquor contains between about 5% and 18% sodium carbonate and up to about 5% sodium bicarbonate.

36. The method of claim 33, wherein the first feed liquor contains about 18% sodium carbonate and about 4% sodium bicarbonate.

37. The method of claim 33, wherein the second feed liquor contains less than about 4% sodium carbonate and more than about 10% sodium bicarbonate.

38. The method of claim 33, wherein the second feed liquor contains about 1% sodium carbonate and about 15% sodium bicarbonate.

39. The method of claim 33, further comprising diluting the first feed liquor before cooling.

40. The method of claim 33, wherein the cooling in step (a) includes exchanging heat with the first mother liquor, the removed insolubles and undissolved ores are washed with water, and the first dissolving solution comprises first mother liquor and the insolubles wash water.

41. The method of claim 33, further comprising the steps of:

(a) melting the sodium carbonate decahydrate crystals and evaporating the water therefrom, thereby forming a first slurry containing sodium carbonate monohydrate crystals;

(b) removing sodium carbonate monohydrate crystals from the slurry thereby forming a filtrate liquor;

(c) drying the removed sodium carbonate monohydrate crystals to form dense soda ash;

(d) calcining the sodium bicarbonate crystals to form light soda ash;

(e) combining light soda ash with some of the filtrate liquor to form sodium carbonate monohydrate crystals; and (f) drying the sodium carbonate monohydrate crystals from step (e) to form dense soda ash.

42. A method of recovering alkali values from trona ore comprising:

(a) partially dissolving trona ore in a first aqueous solution substantially saturated with sodium bicarbonate such that there remains undissolved trona ore;

(b) recovering the undissolved trona ore from the first aqueous solution of step (a);

(c) dissolving the undissolved trona ore in a second aqueous solution to form a feed liquor;

(d) carbonating the feed liquor to convert sodium carbonate into sodium bicarbonate;

(e) cooling the carbonated feed liquor to precipitate sodium bicarbonate and form a mother liquor;

(f) recovering the sodium bicarbonate crystals from the mother liquor;

(g) calcining the sodium bicarbonate crystals to form light soda ash and carbon dioxide; and (h) recycling the carbon dioxide to step (d) as the carbonating medium.

43. The method of claim 42, wherein step (a) is carried out at a temperature between about 10° C. and about 25° C., and step (c) is carried out at a temperature between about 70° C. and about 90° C.

44. The method of claim 42, wherein step (e) includes cooling to a first temperature between about 45° C. and about 60° C., and then cooling to a second temperature between about 10° C. and about 30° C.

45. The method of claim 42, further comprising heating the mother liquor and recycling the heated mother liquor to the second aqueous solution in step (c).

* * * * *

UNITED STATES PATENT AND TRADEMARK OFFICE
CERTIFICATE OF CORRECTION

PATENT NO. : 5,624,647
DATED : April 29, 1997
INVENTOR(S) : Zolotoochin et al.

It is certified that error appears in the above-identified patent and that said Letters Patent is hereby corrected as shown below:

In claim 31, line 2, after "used" insert --in--.

Signed and Sealed this

Eighth Day of June, 1999

Attest:

Q. TODD DICKINSON

*Attesting Officer*      *Acting Commissioner of Patents and Trademarks*